United States Patent [19]
Bader et al.

[11] 3,888,875
[45] June 10, 1975

[54] NOVEL PROCESSES FOR PHOTOGRAPHIC PRODUCTS
[75] Inventors: Henry Bader, Newton Center; Donald O. Rickter, Arlington, both of Mass.
[73] Assignee: Polaroid Corporation, Cambridge, Mass.
[22] Filed: Aug. 29, 1973
[21] Appl. No.: 392,655

[52] U.S. Cl............................ 260/314.5; 260/314.5
[51] Int. Cl............................................. C09b 47/08
[58] Field of Search................................. 260/314.5

[56] References Cited
UNITED STATES PATENTS
3,349,097 10/1967 Kuhne et al. ..................... 260/314.5
3,737,437 6/1973 von Brachel et al............. 260/314.5

*Primary Examiner*—Harry I. Moatz
*Attorney, Agent, or Firm*—John P. Morley

[57] ABSTRACT

An improved process for producing metallized dye developers useful in photographic products.

12 Claims, No Drawings

NOVEL PROCESSES FOR PHOTOGRAPHIC PRODUCTS

BACKGROUND OF THE INVENTION

Part 1. The Field of the Invention

This invention relates to an improved process for producing photographic materials. More precisely, the invention disclosed herein relates to an improved process for producing photographic dye developers especially useful in diffusion transfer photographic products.

Part 2. Description of the Prior Art

Diffusion transfer photographic products employing dye developers are known in the art. One particular class of such dye developers as well as manners of using same in diffusion transfer products is described in U.S. Pat. No. 3,482,972 issued Dec. 9, 1969 to E. M. Idelson. Essentially, the dye developers of U.S. Pat. No. 3,482,972 conform to the following formula:

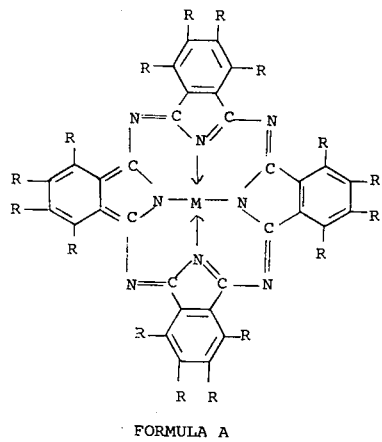

FORMULA A wherein it is provided that of the 16 R substituents present on the phthalocyanine ring at least one and no more than four are as $R^1$ groups, there being no more than two $R^1$ on any one benzene ring, the remaining R substituents being $R^2$ groups, wherein $R^1$ comprises a group $(-A)_n-E$; A is a divalent organic linking radical; $n$ is a number of from 0 to 1 inclusive; E is an aryl group selected from the group consisting of benzene and naphthalene radicals so substituted by at least two groups selected from the group consisting of hydroxyl and amino groups which are situated ortho or para to each other as to be capable of developing an exposed silver halide photographic emulsion; M is a metal selected from the group consisting of cobalt, nickel, copper, chromium, magnesium and zinc; and each $R^2$ comprises the same or a different moiety selected from the group consisting of monovalent organic and monovalent inorganic radicals, neither of which contain a silver halide developing radical, and hydrogen. Typical examples of $R^2$ moieties include: $-SO_3H$, $-Br$, $-NH_4$, $-CH_2Cl$, and $-SO_3NH_4$. Reference is made to Chapter 5 of Moser and Thomas, *Phthalocyanine Compounds*, Reinhold, Copyright 1963.

A preferred class of dye developers within formula (A) comprises the compounds wherein the linking group between the phthalocyanine nucleus and a disubstitutedphenyl silver halide developing radical is

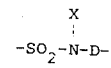

wherein X and D are as defined below.

Such compounds are represented by the formula

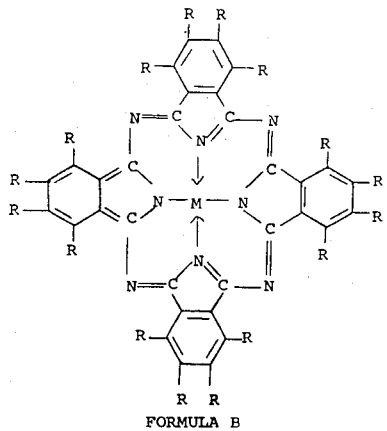

FORMULA B wherein it is provided that of the 16 R substituents present on the phthalocyanine ring at least one and no more than four are as $R^3$ groups, there being no more than two $R^3$ groups on any one benzene ring, the remaining R substituents being $R^4$ groups, wherein $R^3$ is

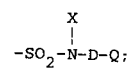

X is H or an alkyl group of 1–6 carbon atoms inclusive; D is an alkylene group of 1–6 carbon atoms inclusive; Q is a disubstituted phenyl silver halide developing radical; M is a metal selected from the group consisting of cobalt, nickel, copper, chromium, magnesium and zinc; and each $R^4$ comprises the same or a different moiety selected from the group consisting of monovalent organic and monovalent inorganic radicals, neither of which contain a silver halide developing radical, and hydrogen.

In the past, compounds of the formula B have been prepared according to the following simplified reaction scheme:

Step 1.

Step 1.

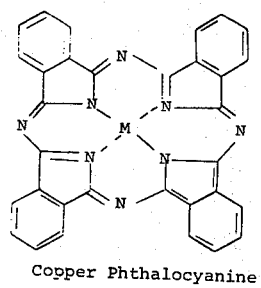

Copper Phthalocyanine

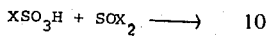

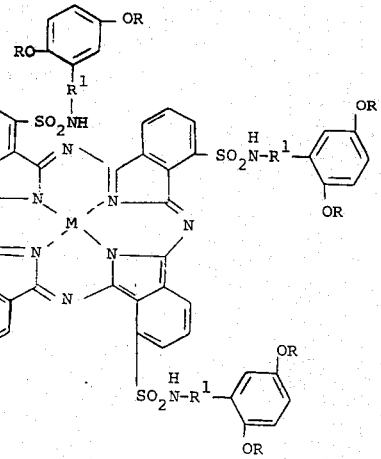

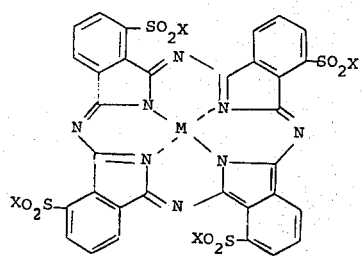

Metal phthalocyanine 3,3',3'',3''' tetrasulfonyl halide where: X is halogen and M is as defined before.

Step 2. (Homogeneous reaction)

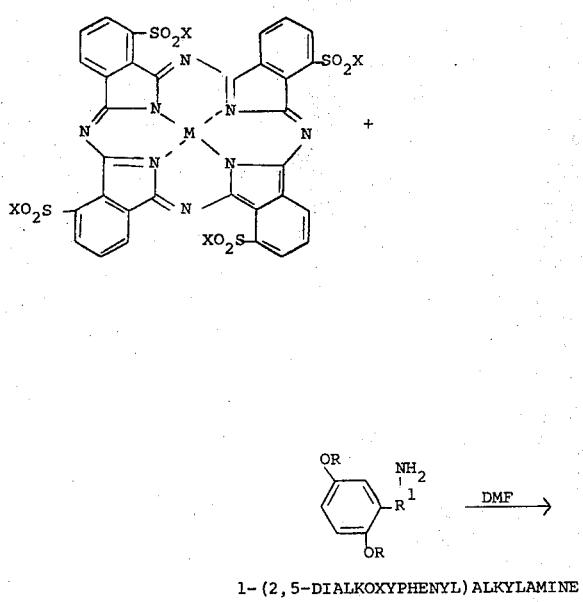

1-(2,5-DIALKOXYPHENYL) ALKYLAMINE where R is an alkyl radical having from 1–6 carbon atoms and $R^1$ is an alkylene radical having from 1–6 carbon atoms.

In the process of the prior art, dimethylformamide was usually employed as the solvent in Step 2. Dimethylformamide provides a suitable homogeneous reaction medium for the metal phthalocyaninetetrasulfonyl halide and the dialkoxyphenylalkylamine; yields in the order of 40–50% or slightly higher were obtained with dimethylformamide or like homogeneous reaction media. The use of dimethylformamide, however, imposed severe constraints on the process. The most serious being that positive measures had to be employed to exclude moisture from Step 2. Otherwise, it was believed that water would compete with the alkylamine of Step 2 providing reduced yields. For example, it is known that the tetrasulfonyl halides undergo rapid hydrolysis and this hydrolysis would be accelerated in the presence of a dipolar solvent such as dimethylformamide. Accordingly, in practicing the process of the prior art, the product of Step 1 was completely dried prior to its use in Step 2. This requisite drying operation was time consuming and involved drying of the product of Step 1 in a vacuum oven over phosphorus pentoxide for three or four days followed by prolonged heating under vacuum. Additionally, such a drying operation poses difficulties especially when applied to large scale operations where increased amounts of moisture would be available to react with the tetrasulfonyl halides and this reaction would be accelerated at elevated temperatures.

The precautions employed to exclude moisture obviously impaired the overall efficiency of the prior art process especially for commercial applications. However, an especially suitable commercial process for preparing dye developers of the type described before has been developed and is disclosed in commonly assigned U.S. application Ser. No. 392,656, filed concurrently herewith by Henry Bader and Alexander Boag. Essentially, the process disclosed therein resides in the discovery that the copper phthalocyaninetetrasulfonyl halide and the dialkoxyphenylalkylamine can be effectively reacted in an aqueous medium. For example, although the reaction is heterogeneous, nevertheless, the yields obtained are at least substantially equivalent to those of the prior art (homogeneous) process. Additionally, in the preferred embodiment of the process disclosed, higher yields are obtained by reacting the tetrasulfonyl halide and amine in an aqueous reaction medium comprising a solvent which is both a solvent for the amine and also miscible in water. The present invention is addressed to the problem of the above-described prior art process to provide improved process which is more acceptable to the art especially from a commercial point of view.

SUMMARY OF THE INVENTION

The process of the present invention essentially involves a modification of Step 2 of the process practiced in the prior art. Instead of using non aqueous solvents such as the dimethylformamide of the prior art processes, the reaction between the copper phthalocyanine tetrasulfonyl halide and the dialkoxyphenylalkylamine is conducted in a medium which is a mixture of water and a solvent which is a solvent for the amine and the reaction product but which is not miscible to any significant degree in water. Accordingly, the process presented in the present claims involves the following sequence of reactions:

Step 1.

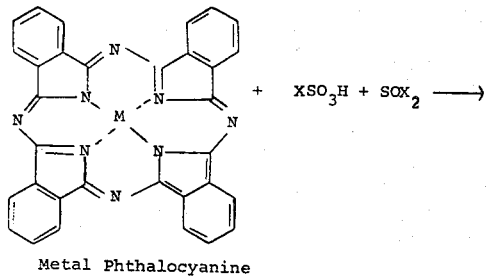

Metal Phthalocyanine

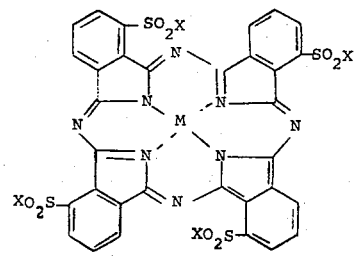

where: X is halogen and M is as defined before.

Metal Phthalocyanine—3,3′,3″,3‴—tetrasulfonyl halide

Step 2. (Heterogeneous Reaction)

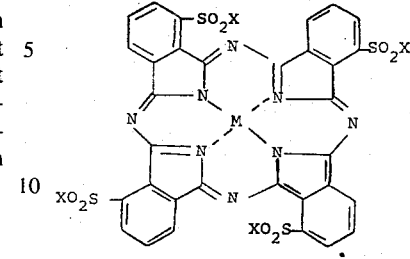

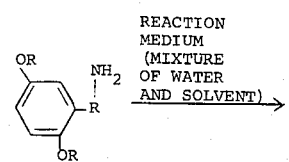

1-(2,5-DIALKOXYPHENYL)ALKYLAMINE

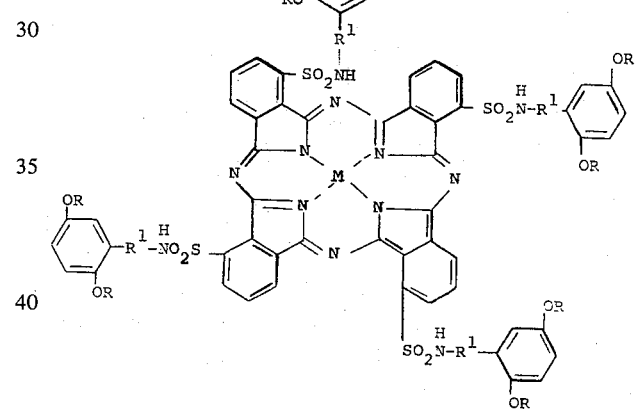

where R is an alkyl radical having from 1–6 carbon atoms and $R^1$ is an alkylene radical having from 1–6 carbon atoms.

Acid is generated during the reaction of Step 2 and accordingly, neutralizing reagents, e.g., a base such as an alkali metal hydroxide, carbonate, or a tertiary amine, etc., are preferably included in the aqueous reaction medium. The amount of reagent employed during the course of the reaction should be at least equivalent to that required to neutralize all the acid produced during the reaction. Preferably, an excess of reagent is included in the aqueous reaction medium prior to the reaction but the reagent may be added incrementally during the course of the reaction if desired.

Unlike the homogeneous reaction of Step 2 of the prior art process, the process of the present invention in which a water-solvent reaction medium is employed involves a heterogeneous reaction and essentially three separate phases exist in the reaction medium. The first phase is an aqueous phase containing dissolved neutralizing reagents. The second phase involves the substantially insoluble, solid tetrasulfonyl halide, while the final phase involves dialkoxyphenylalkylamine dissolved in the solvent of the water-solvent mixture. The reaction between the tetrasulfonyl halide and the dialkoxyphenylalkylamine actually occurs in the amine solvent phase and the reaction product remains dissolved in the solvent phase of the mixture thereby providing for easy recovery of the reaction product. An example of an especially preferred solvent which is a solvent for the amine and which is not miscible in the aqueous phase is methylene chloride. The amount of solvent added to provide the water-solvent reaction medium can vary but optimum yields are obtained when the amount is sufficient to provide a mixture where the solvent represents about 1 to about 70% by volume of the mixture and preferably from about 5 to about 30% by volume of the mixture.

DETAILED DESCRIPTION OF PREFERRED EMBODIMENTS OF THE INVENTION

Details relating to the process of the present invention as well as manners of practicing same will be better appreciated by reference to the following Example.

EXAMPLE 1.

Step 1

Charge 322 gm (182 ml) of chlorosulfonic acid to a 1-liter three-neck flask fitted with a mechanical stirrer, thermometer and reflux condenser. Add 36 gm of copper phthalocyanine via Gooch tubing to the stirred acid, over 5 minutes and bring the pot temperature to 140° over a one hour period. Maintain 140°–145° for 5 hours, then cool to 40°–45°. Add 113 gm (78 ml) of thionyl chloride over 5 minutes. Then heat the reaction mixture to 80°–85° over 30–45 minutes and maintain 80°–85° for an additional 2 hours. Finally, cool the reaction mixture to room temperature. Add this mixture from a dropping funnel, over 1 hour, to a vigorously stirred mixture of 1,500 gm of ice and 1,500 ml of water, while maintaining a temperature of 2° ± 2°C. Filter the slurry through a coarse, sintered-glass funnel and reslurry the cake with 900 ml of ice-water. Suck dry and immediately add the wet copper phthalocyaninetetrasulfonyl chloride thus produced to a mixture described in the Step 2.

STEP 2

Charge 780 ml of water, 78 ml of methylene chloride, 55.5 gm of 2,5-dimethoxyphenylisopropylamine and 36 gm of 50% sodium hydroxide solution to a 3-liter three-neck flask fitted with a mechanical stirrer, thermometer and condenser. Stir moderately, maintain a 20°–30° temperature.

To this mixture add the wet solid tetrasulfonyl chloride from Step 1.

After addition make sure that the pH of the batch is ≥ 12.5, then allow the mixture to stir at 20°–30° for 4 hours. Add 50% NaOH as necessary to maintain a pH ≥ 12.5.

Acidify the mixture with dilute HCl (1 vol. conc. HCl and 2 vols. of water) to a pH of 1.5 – 2.0. Heat the mixture to reflux and distill off the methylene chloride. Continue distilling until a pot temperature of 50°–55° is reached. Apply vacuum cautiously to distill off the last traces of methylene chloride. Hold at 50°–55° under 18–22 inches of vacuum for 30 minutes, then discontinue agitation and cool the mixture to 20°–25°. (As the temperature falls, the product coagulates into a tar which settles out on the bottom of the flask). Decant the supernatant liquors and filter them through a 600 ml, medium, sintered glass funnel. (The tarry product is hard at this point; therefore, the decantate should not contain any solids).

Add 300 ml of water to the reaction flask, stir it and decant again.

The crude product may be purified according to the following procedure:

Add 660 ml each of pyridine and dimethylformamide to the reaction flask containing the tar. Stir and beat to 90°–95° and hold at 90°–95° for 30 minutes, then add dropwise, over a 30 minute period, 760 ml of water while maintaining a 90°–95° temperature. Stir at 90°–95° an additional 30 minutes. Then cool to 60° at a uniform rate over a 5 hour period, allow the mixture to cool further to 20°–25° without external cooling, and without stirring. Finally, cool the contents to 0°–5° and keep at that temperature for 4 hours. Decant the supernatant liquors and filter through a coarse, sintered glass funnel. (Return any collected solids to the batch in the reaction flask.)

Dissolve all the solids in 158 ml of acetone and 45 ml of DMF at 20°–25°. (Stirring for 30–45 minutes may be necessary). Add the solution in a steady stream to a well stirred solution of 26 gm of conc. hydrochloric acid in 1,500 ml of water.

Stir the precipitate for 30 minutes at 20°–25°C. then filter through a coarse, sintered glass funnel. Reslurry the cake with 300 ml of water. Dry the solids in vacuo at 60° to constant weight.

The above process provides yields in the order of 80% and the product has a purity of 98–99%.

Since certain changes can be made in many of the features of the above description and disclosure without departing from the spirit and scope of the invention defined in the appended claims, it is intended that all matter contained in the above description shall be interpreted as illustrative and not in a limiting manner.

What is claimed is:

1. In a process comprising the step of reacting a compound of the formula:

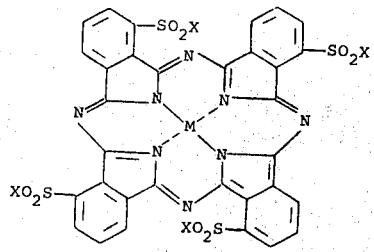

where X is a halogen and M is a metal selected from the group consisting of cobalt, nickel, copper, chromium, magnesium and zinc with an amine of the formula:

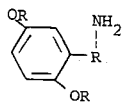

where R is an alkyl radical having from 1–6 carbon atoms to provide a compound of the formula:

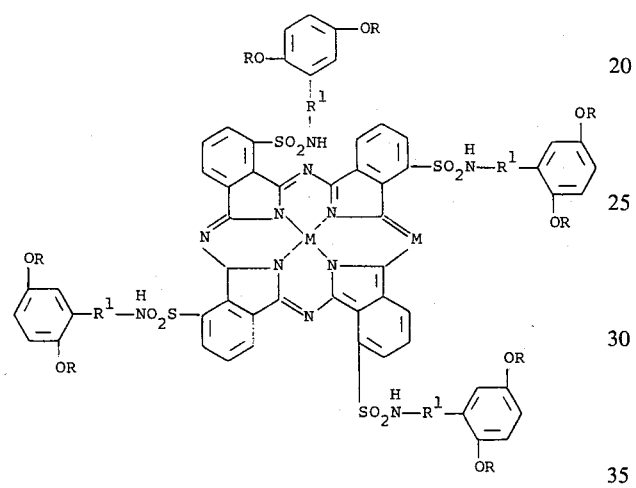

wherein R is an alkyl radical having from 1–6 carbon atoms and $R^1$ is an alkylene radical having from 1–6 carbon atoms; the improvement wherein the compounds are reacted in a medium comprising acid neutralizing reagents and said medium comprises a mixture of water and a solvent which is a solvent for said amine but which is not miscible in said water to any substantial extent.

2. A process of claim 1 wherein said medium comprises a mixture of water and methylene chloride.

3. A process of claim 1 wherein said acid neutralizing reagent comprises an alkali metal hydroxide, or an alkali metal carbonate or an alkali metal bicarbonate or mixtures of these.

4. A process of claim 1 wherein each R is —$CH_3$ and each $R^1$ is

5. A process of claim 1 wherein said medium comprises from about 5 to about 50% by volume of methylene chloride.

6. A process of claim 1 wherein M is copper.

7. A process which comprises the steps of:
Step 1. reacting a compound of the formula:

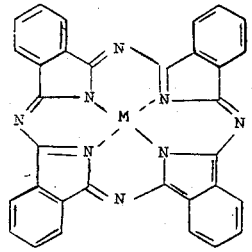

where M is a metal chosen from the group consisting of cobalt, nickel, copper, chromium, magnesium and zinc with compounds of the formulae:

$XSO_3H$ and $SOX_2$ where X is halogen to provide a compound of the formula:

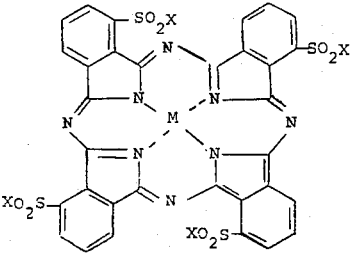

Step 2. reacting the product of Step 1 with an amine of the formula:

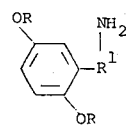

in a reaction medium comprising acid neutralizing reagents wherein said reaction medium comprises a mixture of water and a solvent for said amine but which is not miscible in water to any substantial extent to provide a compound of the formula:

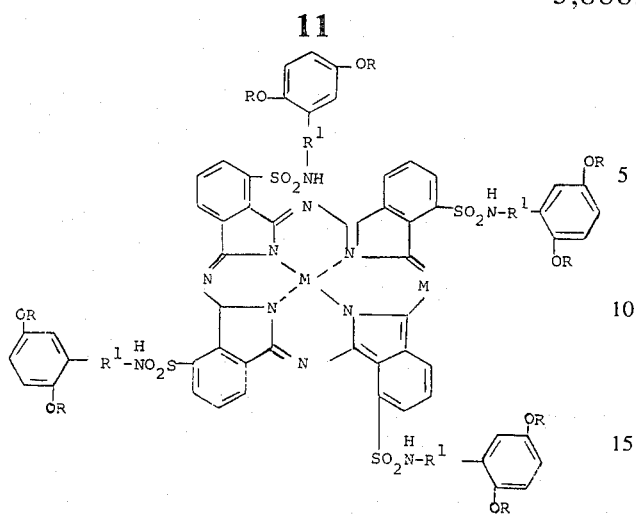

where R is an alkyl radical having from 1–6 carbon atoms and $R^1$ is an alkylene radical having from 1–6 carbon atoms.

8. A process of claim 7 wherein said aqueous medium comprises a mixture of water and methylene chloride.

9. A process of claim 7 wherein said acid neutralizing reagent comprises an alkali metal hydroxide, or an alkali metal carbonate or an alkali metal bicarbonate or mixtures of these.

10. A process of claim 7 wherein each R is $-CH_3$ and each $R^1$ is

11. A process of claim 7 wherein said aqueous medium comprises from about 5 to about 50% by volume of methylene chloride.

12. A process of claim 7 wherein M is copper.

* * * * *